US009182256B2

(12) United States Patent
Wehrs et al.

(10) Patent No.: US 9,182,256 B2
(45) Date of Patent: Nov. 10, 2015

(54) PROCESS VARIABLE TRANSMITTER WITH TWO-WIRE PROCESS CONTROL LOOP DIAGNOSTICS

(75) Inventors: David L. Wehrs, Eden Prairie, MN (US); Gregory J. LeCuyer, Eden Prairie, MN (US); Jessica Lo, Robbinsdale, MN (US); Steven J. McCoy, Eden Prairie, MN (US); Brian L. Westfield, Victoria, MN (US)

(73) Assignee: Rosemount Inc., Eden Prairie, MN (US)

( * ) Notice: Subject to any disclaimer, the term of this patent is extended or adjusted under 35 U.S.C. 154(b) by 221 days.

(21) Appl. No.: 12/832,341

(22) Filed: Jul. 8, 2010

(65) Prior Publication Data

US 2011/0010120 A1    Jan. 13, 2011

Related U.S. Application Data

(60) Provisional application No. 61/224,177, filed on Jul. 9, 2009.

(51) Int. Cl.
*G01R 11/17*    (2006.01)
*G01R 11/16*    (2006.01)
(Continued)

(52) U.S. Cl.
CPC ............ *G01D 21/00* (2013.01); *G05B 19/0423* (2013.01); *G05B 2219/24069* (2013.01)

(58) Field of Classification Search
CPC ................................. G05B 19/00; G05B 19/02
USPC ........... 702/47, 48, 54, 64, 65, 100, 107, 176, 702/182, 183, 184; 700/26, 51; 726/16
See application file for complete search history.

(56) References Cited

U.S. PATENT DOCUMENTS

| 3,959,772 A | 5/1976 | Wakasa et al. |
| 4,020,416 A | 4/1977 | Ottos |

(Continued)

FOREIGN PATENT DOCUMENTS

| CN | 1598722 A | 3/2005 |
| CN | 101147181 A | 3/2008 |

(Continued)

OTHER PUBLICATIONS

Rules 161(1) and 162 EPC Communication from European Patent Office for corresponding European Patent Application No. 10 736 901.9, dated Feb. 17, 2012, 2 pages.

(Continued)

*Primary Examiner* — Eliseo Ramos Feliciano
*Assistant Examiner* — Felix Suarez
(74) *Attorney, Agent, or Firm* — Westman, Champlin & Koehler, P.A.

(57) ABSTRACT

A two-wire process variable transmitter for use in an industrial process, including a process variable sensor configured to sense a process variable of a fluid of the industrial process. Output circuitry is configured to provide an output on a two-wire process control loop which is related to the sensed process variable. Loop current measurement circuitry measures a loop current flowing through the two-wire process control loop and terminal voltage measurement circuitry measures a voltage related to a terminal voltage of the process variable transmitter. The terminal voltage can be a voltage measured across an electrical connection of the two-wire process variable transmitter to the two-wire process control loop. Input circuitry is configured to receive a diagnostic command from the two-wire process control loop. A microprocessor configured to perform loop diagnostics on the two-wire process control loop based upon the measured loop current and terminal voltage in response to receipt of a diagnostic command from the two-wire process control loop.

20 Claims, 6 Drawing Sheets

(51) Int. Cl.
*G06F 3/00* (2006.01)
*G06F 3/01* (2006.01)
*G01D 21/00* (2006.01)
*G05B 19/042* (2006.01)

(56) References Cited

U.S. PATENT DOCUMENTS

| | | | |
|---|---|---|---|
| 4,086,570 A | | 4/1978 | Wakasa et al. |
| 4,403,297 A | | 9/1983 | Tivy |
| 5,223,798 A | | 6/1993 | McGinnis et al. |
| 5,339,025 A | | 8/1994 | Jones et al. |
| 5,382,912 A | | 1/1995 | Blain |
| 5,386,188 A | | 1/1995 | Minneman et al. |
| 5,434,774 A * | | 7/1995 | Seberger ............... 700/67 |
| 5,481,200 A | | 1/1996 | Voegele et al. ......... 324/718 |
| 5,970,430 A | | 10/1999 | Burns et al. |
| 6,006,338 A * | | 12/1999 | Longsdorf et al. ....... 713/340 |
| 6,026,352 A | | 2/2000 | Burns et al. ............ 702/182 |
| 6,437,956 B1 * | | 8/2002 | Montrose ................. 361/56 |
| 6,859,755 B2 | | 2/2005 | Eryurek et al. |
| 6,889,166 B2 * | | 5/2005 | Zielinski et al. ........ 702/183 |
| 6,961,665 B2 * | | 11/2005 | Slezak .................... 702/61 |
| 7,117,122 B2 * | | 10/2006 | Zielinski et al. ........ 702/183 |
| 7,280,048 B2 * | | 10/2007 | Longsdorf et al. ....... 340/664 |
| 7,512,521 B2 * | | 3/2009 | Duren et al. ............ 702/183 |
| 7,526,802 B2 * | | 4/2009 | Mathiowetz et al. ....... 726/16 |
| 7,680,549 B2 * | | 3/2010 | Kavaklioglu et al. ...... 700/26 |
| 2004/0128110 A1 | | 7/2004 | Schulte et al. |

FOREIGN PATENT DOCUMENTS

| | | |
|---|---|---|
| GB | 2224853 A | 5/1990 |
| GB | 2260416 A | 4/1993 |
| JP | 55023638 A | 2/1980 |
| JP | 2006512679 | 4/2006 |

OTHER PUBLICATIONS

Notification of Transmittal of the International Search Report and Written Opinion for PCT Application No. PCT/US2010/041338, dated Nov. 7, 2011, 9 pgs.
EPO Communication pursuant to Article 94(3) EPC for European Patent Application No. 10 736 901.9-1236, dated Nov. 20, 2012, 4 pages.
Communication pursuant to Article 94(3) EPC for European Patent Application No. 10 736 901.9-1557, dated Apr. 10, 2013, 4 pages.
Rejection Notice dated Dec. 25, 2013 in related Japanese patent application No. 2012-519721, 5 pgs. Including English Translation.
Second Chinese Office Action for Chinese Patent Application No. 201080014378.7, dated Apr. 21, 2015, 6 pages.
First Chinese Office Action for Chinese Patent Application No. 201080014378.7, dated Sep. 2, 2014, 23 pages.

* cited by examiner

Characterize Loop - Terminal Supply Voltage too Low

Terminal Supply Voltage too Low

The electrical Loop Power Characterization analysis indicates that the Terminal Voltage will be below the 12 Vdc minimum requirement when the transmitter is outputting high current Recommended Actions:
1. Initiate a Loop Test
2. Set output to 23 mA
3. Measure voltage at the terminal block
4. Increase power supply voltage or decrease loop resistance until voltage is above 12 Vdc
5. Restart Loop Characterization Print    Close Characterize Loop - Terminal Supply voltage too High Terminal Supply Voltage too High The electrical Loop Power Characterization analysis indicates that the Terminal Voltage will be above the 42.4 Vdc maximum requirement when the transmitter is outputting low current.

Recommended Actions:
1. Initiate a Loop Test
2. Set output to 3.6 mA
3. Measure voltage at the terminal block
4. Decrease power supply voltage or increase loop resistance until voltage is below 42.4 Vdc
5. Restart Loop Characterization Print    Close

PROCESS VARIABLE TRANSMITTER WITH TWO-WIRE PROCESS CONTROL LOOP DIAGNOSTICS

CROSS-REFERENCE TO RELATED APPLICATION

The present application is based on and claims the benefit of U.S. provisional patent application Ser. No. 61/224,177, filed Jul. 9, 2009, the content of which is hereby incorporated by reference in its entirety.

BACKGROUND OF THE INVENTION

The present invention relates to two-wire industrial process control transmitters used to monitor process variables in industrial processes. In particular, the present invention relates to a process variable transmitter which is capable of performing diagnostics on a two-wire process control loop.

Process variable transmitters are used in industrial processes to measure process one or more variables at remote locations in the "field", and transmit information related to the process variable back to a centralized location such as a control room. Example process variables include pressure, temperature, flow rate, level, etc.

In one configuration, the process variables are transmitted over a two-wire process control loop. The two-wire process control loop connects the process variable transmitter to the control room and, in addition to carrying communication, can also be used to provide power to the process variable transmitter. One example two-wire process control loop is a 4-20 mA process control loop in which the current level ranges between 4 and 20 mA and can be controlled to represent a sensed process variable. Another example process control loop operates in accordance with the HART® (Highway Addressable Remote Transducer) communication protocol. In a process control loop using HART® communication techniques, a digital signal is superimposed on a substantially DC current level carried on the loop. This allows the process control loop to carry both analog and digital signals. The digital signals can be used to transmit additional information from the process variable transmitter to the control room, or transmit data from the control room to the process variable transmitter. Another example two-wire process control loop operates in accordance with a Fieldbus communication protocol in which typically all of the data is carried in a digital format.

If the process control loop is not operating optimally, it is possible for errors to be transmitted by the process variable transmitter, or the loop may provide insufficient power for operation of the process variable transmitter. Other errors including partial failures or total failures may also arise due to problems associated with the two-wire process control loop. Therefore, it is desirable to perform diagnostics on the two-wire process control loop to ensure proper operation. One example of such diagnostics is shown and described in U.S. Pat. No. 5,481,200, entitled FIELD TRANSMITTER BUILT-IN TEST EQUIPMENT issued Jan. 2, 1996 to Voegle et al. and assigned to Rosemount Inc.

SUMMARY OF THE INVENTION

A two-wire process variable transmitter for use in an industrial process, including a process variable sensor configured to sense a process variable of a fluid of the industrial process. Output circuitry is configured to provide an output on a two-wire process control loop which is related to the sensed process variable. Loop current measurement circuitry measures a loop current flowing through the two-wire process control loop and terminal voltage measurement circuitry measures a voltage related to a terminal voltage of the process variable transmitter. The terminal voltage can be a voltage measured across an electrical connection of the two-wire process variable transmitter to the two-wire process control loop. Input circuitry is configured to receive a diagnostic command from the two-wire process control loop. A microprocessor configured to perform loop diagnostics on the two-wire process control loop based upon the measured loop current and terminal voltage in response to receipt of a diagnostic command from the two-wire process control loop.

DETAILED DESCRIPTION OF ILLUSTRATIVE EMBODIMENTS

The present invention is a transmitter in a two-wire process control loop including electronics to measure resistance of the current loop and voltage of the power supply used to power the loop. The electrical current flowing in a process loop will exceed a desired process loop current value when a transmitter electronics current has a high leakage or shunt current such as when moisture or some other electrical conductor contacts the electrical supply rail for an internal transmitter electronics circuit. This can lead to communication failures or indicate a component failure.

Figure 1:
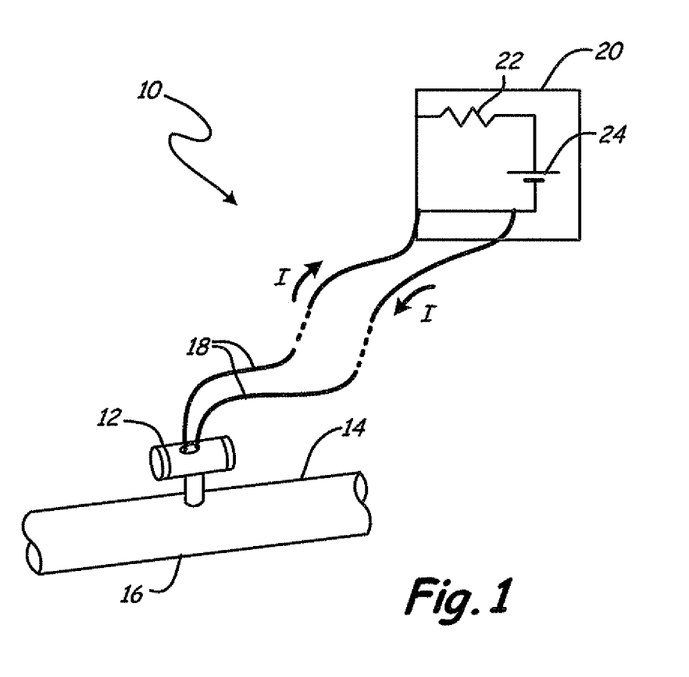
FIG. 1 is simplified block diagram showing a process control system including a process variable transmitter.

FIG. 1 is a simplified diagram of an industrial process control or monitoring system 10. System 20 includes a process variable transmitter 12 having a process variable sensor arranged to sense a process variable of a process fluid. In this example, the process fluid is illustrated as contained in process piping 16. The process variable can be any appropriate property related to the process fluid such as flow rate, temperature, pressure, pH, etc. The process variable transmitter 12 couples to a two-wire process control loop 18 which carries a loop current I. In the example installation, the process variable transmitter is located at a remote location in the "field" of an industrial process and couples to a control room 20 at a centralized location through the two-wire process control loop 18. In this example, the control loop 20 is illustrated as a sense resistor 22 and a voltage source 24.

With the present invention, an on-demand loop characterization function is provided, which is configured to store baselines of power supply and loop resistance. The system can be used to determine if the power supply, associated loop wiring and load resistance are all functioning properly such that the transmitter 12 can output a correct current value I at the minimum and maximum output levels used to indicate an alarm condition. This capability will ensure that the transmitter is able to provide an output over a desired range of current I values.

Figure 2:
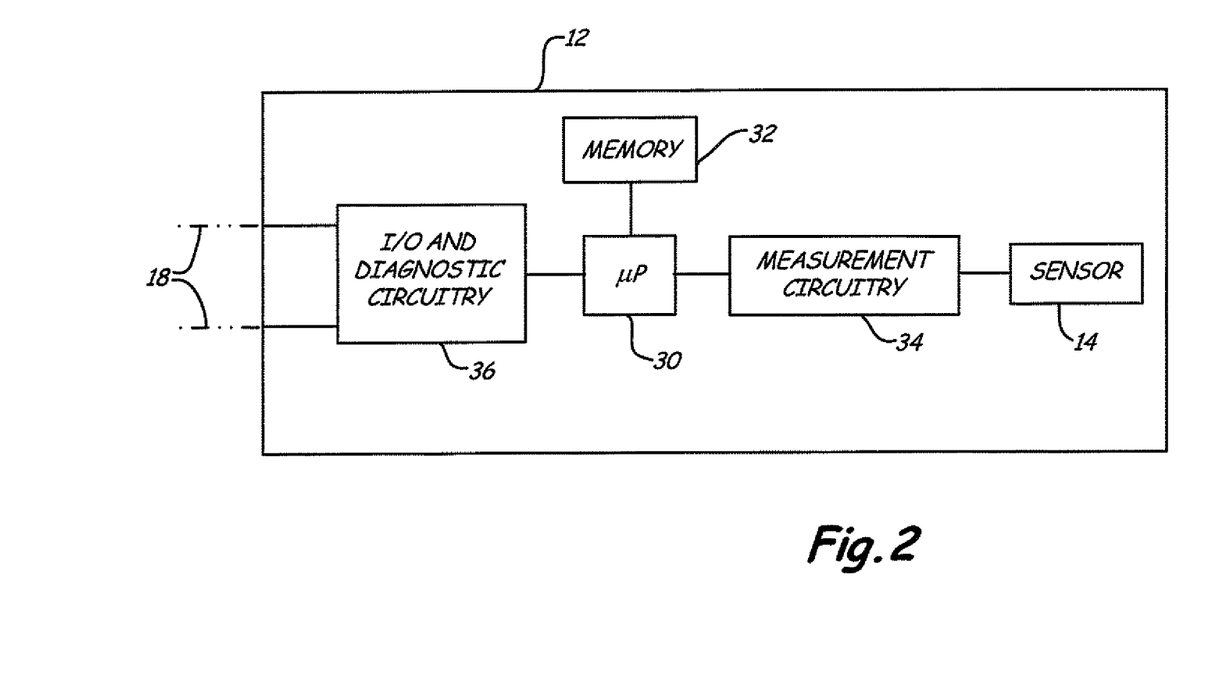
FIG. 2 is a block diagram of components of transmitter FIG. 1.

FIG. 2 is a simplified block diagram showing process variable transmitter 12. Process variable transmitter 12 includes a microprocessor which operates in accordance with instructions stored in a memory 32. Microprocessor 30 receives an output from the process variable sensor 14 through measurement circuitry 34. Measurement circuitry 34 can be utilized to include analog or digital components to process the output from sensor 14. Further, process variable transmitter 12 includes I/O and diagnostic circuitry 36 which couples to two-wire process control loop 18. Microprocessor 30 couples to I/O and diagnostic circuitry and is configured to communicate over two-wire process control loop 18 using the circuitry 36. This communication can be either analog and/or digital and may optionally be bi-directional. Example communication techniques include a 4-20 mA communication technique in which the process control loop 18 carries a signal ranging from 4-20 mA to represent a value related to the output from the process variable 14. A current level outside of this range can be used to indicate an alarm condition. A variation on this communication protocol is the HART® communication protocol in which digital information is modulated on the analog current level carried on the two-wire process control loop 18. Other communication protocols include all digital communication protocols such as a FieldBus based protocol.

Figure 3:
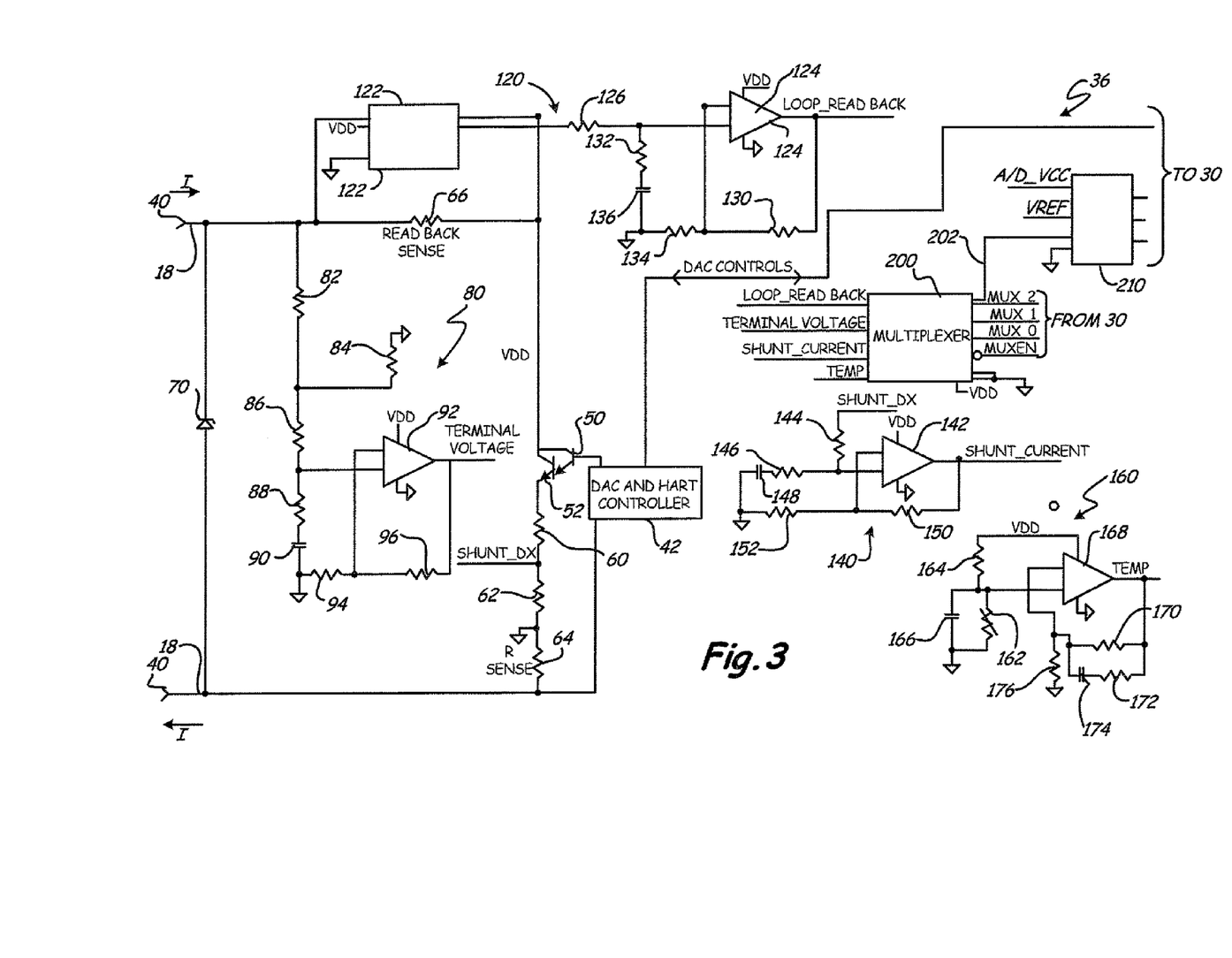
FIG. 3 is a simplified schematic diagram showing diagnostics circuitry in the transmitter of FIG. 1.

FIG. 3 is a more detailed block diagram of I/O and diagnostic circuitry. I/O and diagnostic circuitry couples to two-wire process control loop 18 through terminals 40. This provides Loop + and Loop − connections to the two-wire process control loop 18. Microprocessor 30 (not shown in FIG. 3) couples to a digital to analog converter in HART® controller 42 which is used to control the current I flowing through loop 18. Digital and analog and HART® controller 42 provides an analog control signal. A readback and sense resistance 66 is also coupled in series with the two-wire process control loop 18. A protection diode 70 is connected across the loop terminals 40. TERMINAL_VOLTAGE measurement circuitry 80 is configured to couple to terminals 40 and provide a TERMINAL_VOLTAGE output which is representative of the voltage across the terminals 40. Circuitry 80 includes a resistor divider network formed by resistors 82 and 84. Components 86, 88 and 90 are for safety and filtering. An amplifier 92 connects to the divider network and the feedback network 96 and 94 scale the divided voltage for input to 210. During operation, the TERMINAL_VOLTAGE output from differential amplifier 92 is representative of the voltage across terminals 40.

Circuitry 36 also includes a readback circuit 120 which is configured to provide a LOOP_READ_BACK output related to the current level I flowing through two-wire process control loop 18. LOOP_READ_BACK circuitry 120 includes a difference amplifier 122 connected across the readback sense resistor 66. Difference amplifier 122 provides an output to operation amplifier 124 through a filtering set up with 126, 132, and 136. Operational amplifier 124 is arranged with negative feedback through resistor 130 to achieve appropriate values for 210.

SHUNT_CURRENT measurement circuitry 140 is provided to measure the SHUNT_CURRENT flowing through resistors 60 and 62. In the configuration shown in FIG. 3, an operational amplifier 142 has a non-inverting input coupled to SHUNT_DX through resistor 144. The non-inverting input also couples to electrical ground to resistor 146 and capacitor 148. Negative feedback to the inverting input is provided by resistor 150 which also couples to electrical ground through resistor 152. SHUNT_CURRENT measurement circuitry 140 provides a SHUNT_OUTPUT. The temperature of the process variable transmitter 12 is also measured using temperature measurement circuitry 160. Temperature measurement circuitry 160 includes an RTD element 162 which has a resistance which varies as a function of temperature. Element 162 couples to voltage source VTD through a resistor 164. A capacitance 166 is connected across element 162. The voltage drop across element 162 is measured by operational amplifier 168. Negative feedback is provided through resistors 170 and 172 and capacitor 174. The inverting input of operational amplifier 168 also couples to electrical ground to resistance 176. Circuitry 160 provides an output TEMP which is indicative of the temperature of element 162.

A multiplexor 200 is provided which has inputs which couple to the output from circuits 92, 120, 140 and 160. Multiplexor 200 is used to select from one of LOOP_READ_BACK, TERMINAL_VOLTAGE, SHUNT_CURENT or TEMP outputs from the circuits. Channels of the multiplexor 200 is controlled using inputs to the multiplexor which are coupled to the microprocessor 30 shown in FIG. 2. An output 202 from the multiplexor 200 is connected to an analog to digital converter 210. Analog to digital converter converts an analog signal on output 202 into a digital format which is provided to the microprocessor 30 shown in FIG. 2. During operation, microprocessor 30 controls multiplexor 200 such that the various voltages are selected and coupled to the analog to digital converter 210 which then can be read by the microprocessor 30.

During operation, software run by microprocessor 30 is configured to make four measurements:

LOOP_READ_BACK: measure loop current.

TERMINAL_VOLTAGE: measure voltage present between the Loop + and Loop − terminals of the transmitter 12.

SHUNT_CURRENT: a measurement used to determine the quiescent current used by circuitry in the transmitter 12.

TEMP: a measurement used for temperature compensation.

In one configuration, the microprocessor measures these values periodically, for example every one second, and uses these measurements for loop diagnostics. Additionally, loop diagnostics can be performed based upon a request received over the two-wire process control loop 18.

The system can perform an electrical characterization. For example, upon receipt of a request via HART® communication, the system is characterized by determining the loop resistance and the loop power supply. This process can be initiated through a method implemented with an Electronic Device Description Language (EDDL), which is a language and interface used for communication with field devices.

Initially, the characterization process includes obtaining the TERMINAL_VOLTAGE and LOOP_READ_BACK measurements. A first pre-check can be performed with a 4 mA signal and a 6 mA signal to determine if the system is capable of achieving extreme values such as 23 mA and 3.6 mA. Initially, the microprocessor 30 sets the loop current to 4 mA and waits for the current level to stabilize. Next, measurements are required and the microprocessor stores the LOOP_READ_BACK and TERMINAL_VOLTAGE values at 4 mA (Loop_ReadBack_4 and Terminal_Voltage_4) values in memory 32. Next, the loop current is adjusted to 6 mA and the system waits for the current level to stabilize. Loop_Readback_6 and Terminal_Voltage_6 values are measured. A loop resistance pre-check is calculated using Equation:

$$\text{Loop\_Resistance\_preCheck}(\Omega) = \frac{\begin{pmatrix} \text{TERMINAL\_VOLTAGE\_4} - \\ \text{TERMINAL\_VOLTAGE\_6} \end{pmatrix}}{\begin{pmatrix} \text{LOOP\_READ\_BACK\_6} - \\ \text{LOOP\_READ\_BACK\_4} \end{pmatrix}} \quad \text{Equation 1}$$

Next, a power supply voltage pre-check value is obtained using Equation 2:

$$\text{Vps\_preCheck(volts)} = \text{TERMINAL\_VOLTAGE\_4} + (\text{LOOP\_READ\_BACK\_4} * \text{Loop\_Resistance}) \quad \text{Equation 2}$$

These pre-cheek values of loop resistance and power supply voltage are used to verify that the system is capable of operating when the output is set to its extreme minimum (VTmin) and maximum (VTmax) values, for example at 3.6 mA and at 23.0 mA, respectively. These values are calculated according to Equations 3 and 4:

$$\text{VTmin(volts)} = \text{Vps\_PreCheck} - \text{LOOP\_RESISTANCE\_preCheck} * 0.023 \quad \text{Equation 3}$$

$$\text{VTmax(volts)} = \text{Vps\_PreCheck} - \text{LOOP\_RESISTANCE\_preCheck} * 0.0036 \quad \text{Equation 4}$$

Figure 4:
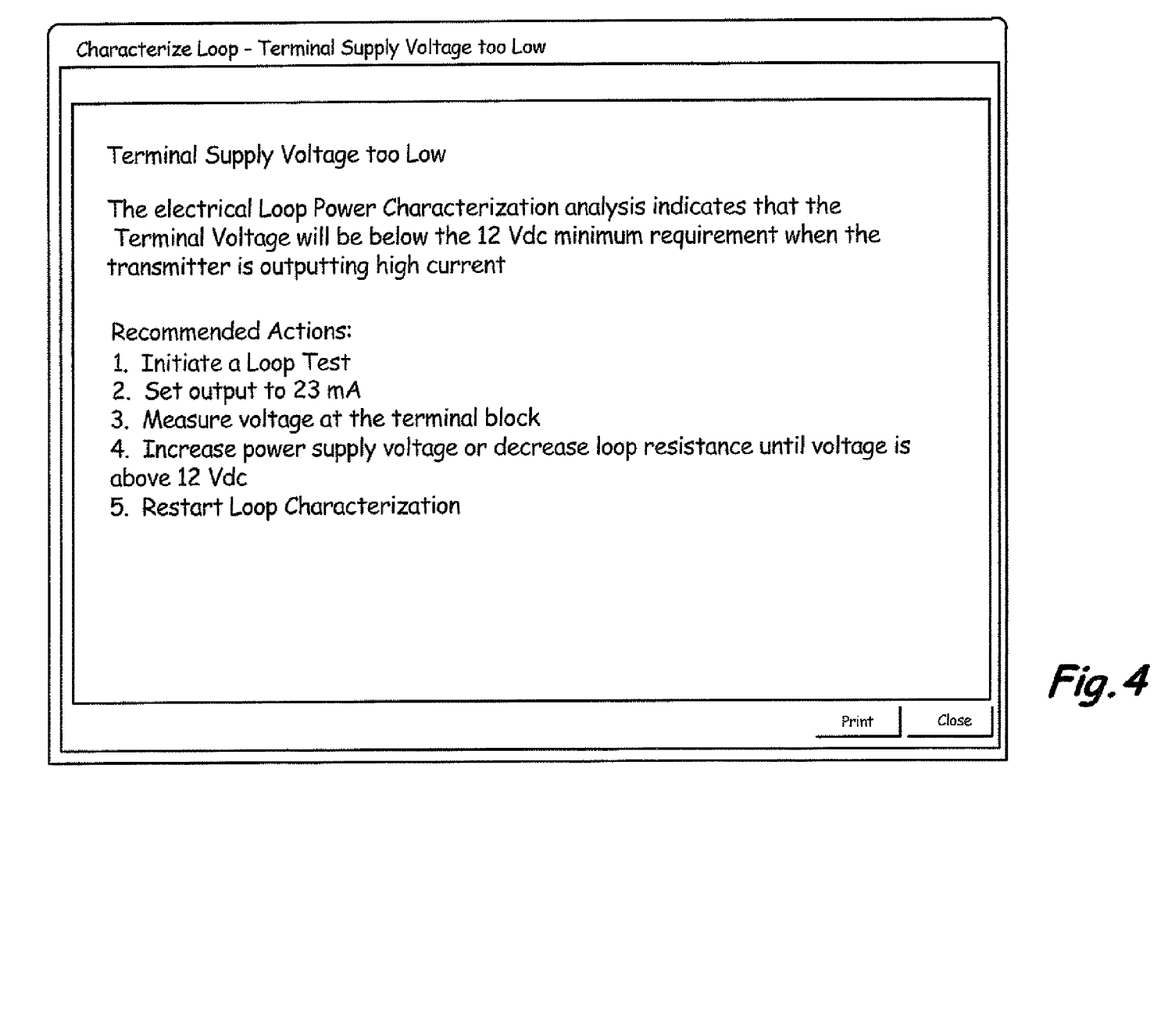
FIG. 4 is a screen capture from diagnostic software indicating that the terminal supply voltage is too low.
Figure 5:
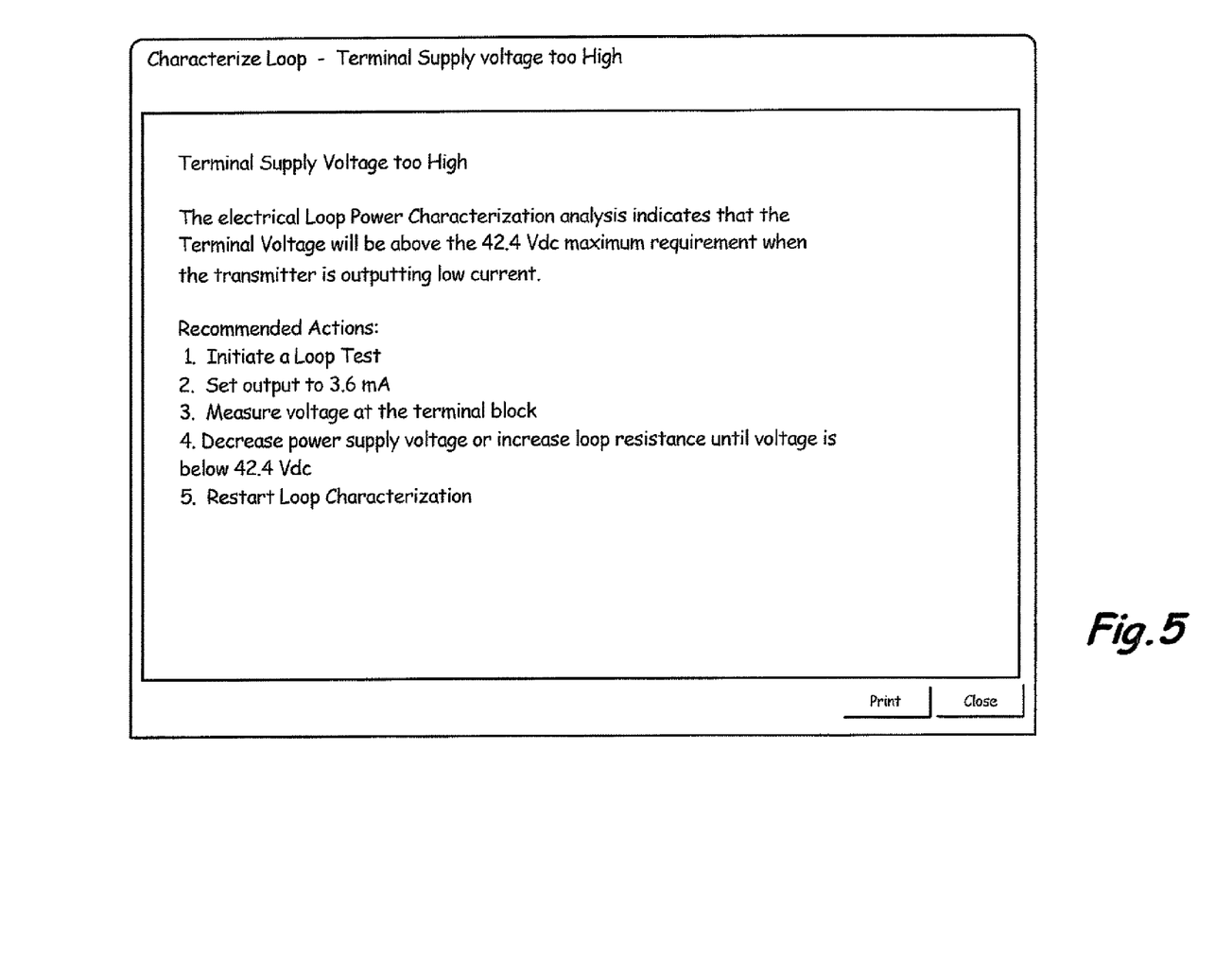
FIG. 5 is a screen capture from diagnostic software indicating that the terminal supply voltage is too high.

If VTmin is below a minimum the specified TERMINAL_VOLTAGE for this system, for example 12 volts, or VTmax is above a maximum specified TERMINAL_VOLTAGE for the system, for example, 42.4 volts, the microprocessor can be configured to provide a warning to the user, for example, by transmitting data through the two-wire process loop 18 or by providing a visual output, etc., which instructs the user to adjust the power supply 24 shown in FIG. 1 as appropriate. This warning can be transmitted over the two-wire process control loop 18 to a hand held field maintenance device or, can be transmitted to an asset management system located in the control room 20, etc. The transmission can be in accordance with, for example, an Electronic Device Description Language (EDDL). FIGS. 4 and 5 illustrate outputs from a computer screen which indicate a low loop supply voltage or a high loop supply voltage, respectively.

Next, the characterization process proceeds by setting the output to a 20 mA level and storing the values LOOP_READ_BACK_20 and TERMINAL_VOLTAGE_20, once the loop circuit is stabilized. After these measurements have been obtained, operation of the loop is returns to normal. The power supply voltage Vps and loop resistance values are recalculated over the entire range of operation (4 mA and 20 mA). The TERMINAL_VOLTAGE can be checked periodically. Loop resistance is calculated and stored in accordance with Equation 5:

$$\text{Loop\_Resistance}(\Omega) = \frac{\begin{pmatrix} \text{TERMINAL\_VOLTAGE\_4} - \\ \text{TERMINAL\_VOLTAGE\_20} \end{pmatrix}}{\begin{pmatrix} \text{LOOP\_READ\_BACK\_20} - \\ \text{LOOP\_READ\_BACK\_4} \end{pmatrix}} \quad \text{Equation 5}$$

The loop resistance can also be used to verify that the minimum resistance required for communication is met, i.e., 250 ohms.

During normal operation, the microprocessor 30 can also calculate and store the power supply voltage Vps as follows:

$$\text{Vps(volts)} = \text{TERMINAL\_VOLTAGE\_4} + (\text{LOOP\_READ\_BACK\_4} * \text{LOOP\_RESISTANCE}) \quad \text{Equation 6}$$

Once the loop resistance and loop power supply voltage have been calculated, the system can return to normal runtime operation.

During normal runtime, the microprocessor 30 can perform periodical diagnostics by measuring the LOOP_READ_BACK, TERMINAL_VOLTAGE and SHUNT_CURRENT values. These values can be scaled by applying an appropriate gain or offset voltage and compensated for temperature. The LOOP_READ_BACK current value can be compared against a current reference output. If the difference between the two is greater than a predefined threshold, (for example 2% of a span) an alert can be sent on the two-wire communication loop, for example by using a HART® communication protocol, or an alarm can be generated locally as desired. The TERMINAL_VOLTAGE is measured and compared against an expected calculated value (calculated using loop resistance and the power supply baselines). For this calculation, the ongoing current value (in mA) is used as opposed as the test current value. TERMINAL_VOLTAGE is calculated in accordance with Equation 7:

$$\text{VT\_calculated} = \text{Power\_Supply\_Voltage} - (\text{Loop\_Resistance} * \text{LOOP\_READ\_BACK}) \quad \text{Equation 7}$$

If the measured TERMINAL_VOLTAGE is in disagreement with VT_Calculated by more than user selectable value ("max TERMINAL_VOLTAGE") as shown in FIG. 5, then an alert can be transmitted on the two-wire process control loop and a local alarm generated as desired.

Typically, two-wire transmitters couple to a process control loop through a terminal block which contains diodes and resistors. However, in the present configuration, a temperature measurement is obtained which can be used to compensate for variations in the electrical characteristics of the diodes and resistors based upon temperature changes. This can improve the accuracy of the measurement and in particular the accuracy of the TERMINAL_VOLTAGE and LOOP_READ_BACK measurements.

The quiescent current is defined as the current required for operation of circuitry for the transmitter 12. The quiescent current can be useful in performing diagnostics. The quiescent current can be measured using SHUNT_CURRENT reading and a synchronized loop current value (output current reference). Quiescent current is calculated as:

$$\text{Quiescent\_Current} = \text{Loop\_Current\_Reference} - \text{SHUNT\_CURRENT\_Read} \quad \text{Equation 8}$$

If the quiescent current exceeds a predefined value, for example if the quiescent value is greater than 3.4 mA, then an alert can be transmitted on the two-wire process control loop and a local alarm generated as desired. Further, a dynamic threshold value can be compared to the quiescent current to verify that communication requirements are met. For example, a low alarm setting minus the quiescent current should be greater than 0.5 mA.

The measured temperature can be used to compensate the various components of the diagnostic circuitry as desired. This compensation can be through, for example, polynomial curve fitting techniques. The temperature characterization information can be stored in memory 32. For example, memory 32 can include nonvolatile memory for extended storage of such values. The temperature characterizations can be performed during manufacture of transmitter 12. During a calibration of the 4-20 mA output, the microprocessor can also perform a LOOP_READ_BACK calibration at the same time and the resultant coefficient stored in memory 32. Other information which may be stored in a nonvolatile portion of memory 32 include various threshold levels and other information and can be accessible to user via the HART® communication technique.

Figure 6:
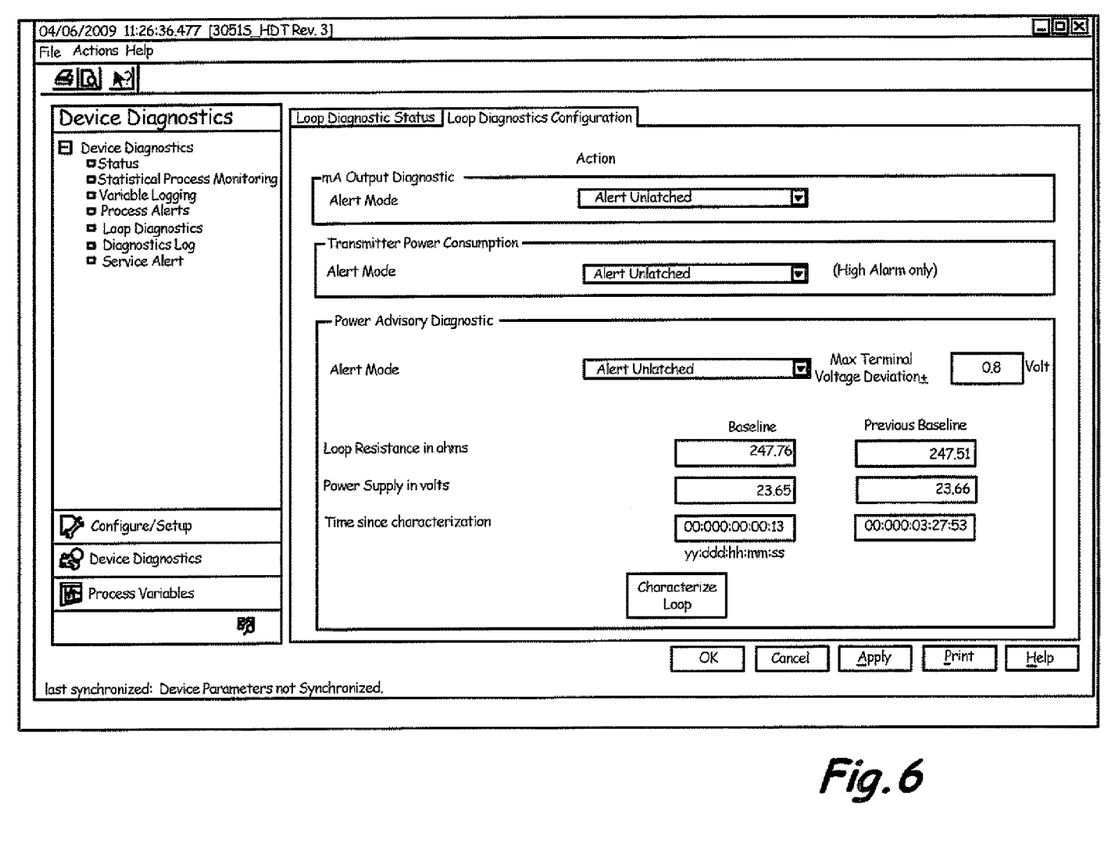
FIG. 6 is a screen capture showing an operator interface for interacting with diagnostic software in the transmitter of FIG. 1.

FIG. 6 is a screen dump from computer software running a program for communicating with the transmitter 12 in accordance with Electronic Device Description Language (EDDL). As illustrated in FIG. 6, various parameters can be viewed or configured including alert modes, power advisory diagnostics, etc. The various measurements and base line measurements obtained by the transmitter 12 can be viewed on the screen and the system can be instructed to initiate a request to perform a loop characterization.

During measurement of the various current and voltages, it is preferable that measurements occur in synchronization. For example, if resistance is calculated with voltage and current measurements, it is preferable that the voltage and current measurements occur in synchronization. In order to improve synchronizing of the measurements, the software can be configured to use resource locking in sychronist storage techniques. Further, the software can preferably operate in a prioritized mode to elevate its priority. Specifically, the analog output resource can be locked by the diagnostic software while the diagnostics are performed.

Although the present invention has been described with reference to preferred embodiments, workers skilled in the art will recognize that changes may be made in form and detail without departing from the spirit and scope of the invention. In one configuration, upon receipt of a diagnostic command, the microprocessor performs a loop characterization and determines baseline values for the loop power supply and the loop resistance. During the characterization, the microprocessor can also check to ensure that the terminal voltage at the field device is between 12 volts and 42.4 volts.

What is claimed is:

1. A two-wire process variable transmitter for use in an industrial process, comprising:
   terminals configured to couple to a two-wire process control loop;
   a process variable sensor configured to sense a process variable of a process fluid of the industrial process;
   output circuitry coupled to the terminals configured to provide an output on the two-wire process control loop which is related to the sensed process variable;
   current measurement circuitry coupled to the terminals configured to measure a loop readback current flowing through the two-wire process control loop and a shunt current;
   terminal voltage measurement circuitry coupled to the terminals configured to measure a voltage related to a terminal voltage of the process variable transmitter, the terminal voltage comprising a voltage measured across the terminals of the two-wire process variable transmitter;
   a microprocessor configured to perform loop diagnostics on the two-wire process control loop based upon the measured loop readback current, the measured shunt current and terminal voltage and calculate a loop resistance based upon a difference in the measured terminal voltage measured with two different current levels flowing through the two-wire process control loop and a difference in the measured loop readback current with the two different current levels flowing through the two-wire process control loop.

2. The two-wire process variable transmitter of claim 1 wherein the diagnostic command causes the microprocessor to perform a loop characterization.

3. The two-wire process variable transmitter of claim 1 wherein the diagnostics include a determination of a voltage of a power supply of the two-wire process control loop.

4. The two-wire process variable transmitter of claim 1 wherein the diagnostics include performing a preliminary diagnostic check.

5. The two-wire process variable transmitter of claim 1 wherein the diagnostics include determining a baseline diagnostic value.

6. The two-wire process variable transmitter of claim 1 wherein the diagnostics include determining a quiescent current value.

7. The two-wire process variable transmitter of claim 1 including a temperature sensor and wherein the diagnostics are compensated based upon a sensed temperature.

8. The two-wire process variable transmitter of claim 1 wherein measurement of the loop readback current and terminal voltage are performed in synchronization.

9. The two-wire process variable transmitter of claim 1 wherein the diagnostic command is in accordance with an Electronic Device Description Language (EDDL).

10. The two-wire process variable transmitter of claim 1 including:
    input circuitry coupled to the terminals configured to receive a diagnostic command from the two-wire process control loop; and
    wherein the microprocessor is configured to perform loop diagnostics in response to a diagnostic command received from the two-wire process control loop.

11. A method of performing diagnostics in a two-wire process variable transmitter of an industrial process, comprising:
    coupling terminals of the two-wire process variable transmitter to a two-wire process control loop;
    sensing a process variable of a process fluid of the industrial process;
    providing an output on the two-wire process control loop which is related to the sensed process variable;
    coupling current measurement circuitry to the two-wire process control loop, the current measurement circuitry configured to measure a loop readback current flowing through the terminals of the two-wire process variable transmitter and a shunt current;
    coupling terminal voltage measurement circuitry to the terminals of the two-wire process variable transmitter, the terminal voltage measurement circuitry configured to measure a terminal voltage across the terminals of the two-wire process variable transmitter; and
    performing diagnostics on the two-wire process control loop, the diagnostics performed using the measured loop readback current, the measured shunt current, and the measured terminal voltage, the diagnostics including calculating a loop resistance based upon a difference in the measured terminal voltage measured with two different current levels flowing through the two-wire process control loop and a different in the measured loop readback current with the two different current levels flowing through the two-wire process control loop.

12. The method of claim 11 wherein the diagnostics include a determining of a voltage of a power supply of the two-wire process control loop.

13. The method of claim 11 wherein the diagnostics include performing a preliminary diagnostics check.

14. The method of claim 11 wherein the diagnostics include determining a baseline diagnostic value.

15. The method of claim 11 wherein the diagnostics include determining a quiescent current value.

16. The method of claim 11 including sensing a temperature and wherein the diagnostics are compensated based upon the sensed temperature.

17. The method of claim 11 wherein measurement of the loop readback current and terminal voltage are performed in synchronization.

18. The method of claim 11 wherein the diagnostic command is in accordance with an Electronic Device Description Language (EDDL).

19. The method of claim 11 wherein characterizing includes measuring baseline values for loop resistance and loop power supply voltage.

20. The method of claim 11 wherein the step of performing diagnostics is in response to receiving a diagnostic command from the two-wire process control loop.

* * * * *